C. W. GAGE.
Wagon-Brake.
No. 52,703.
Patented Feb. 20, 1866.
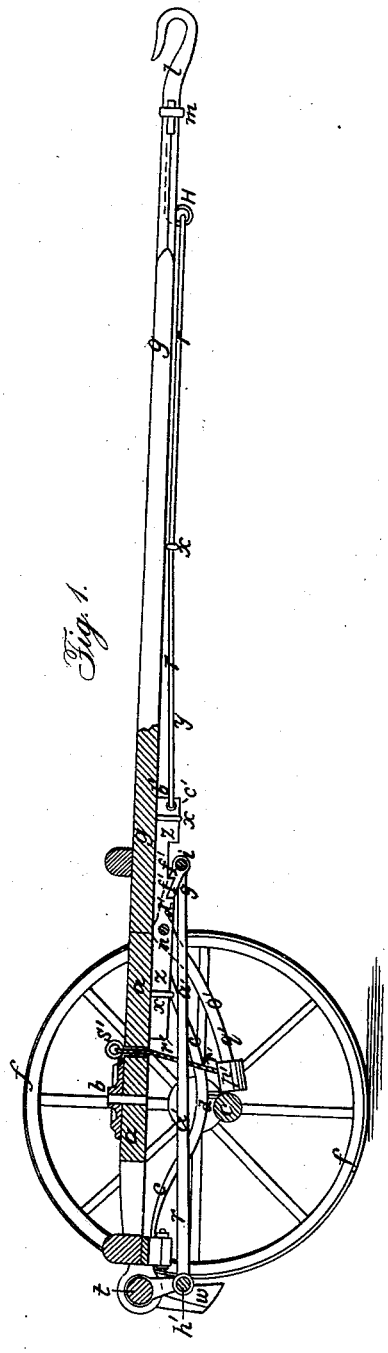
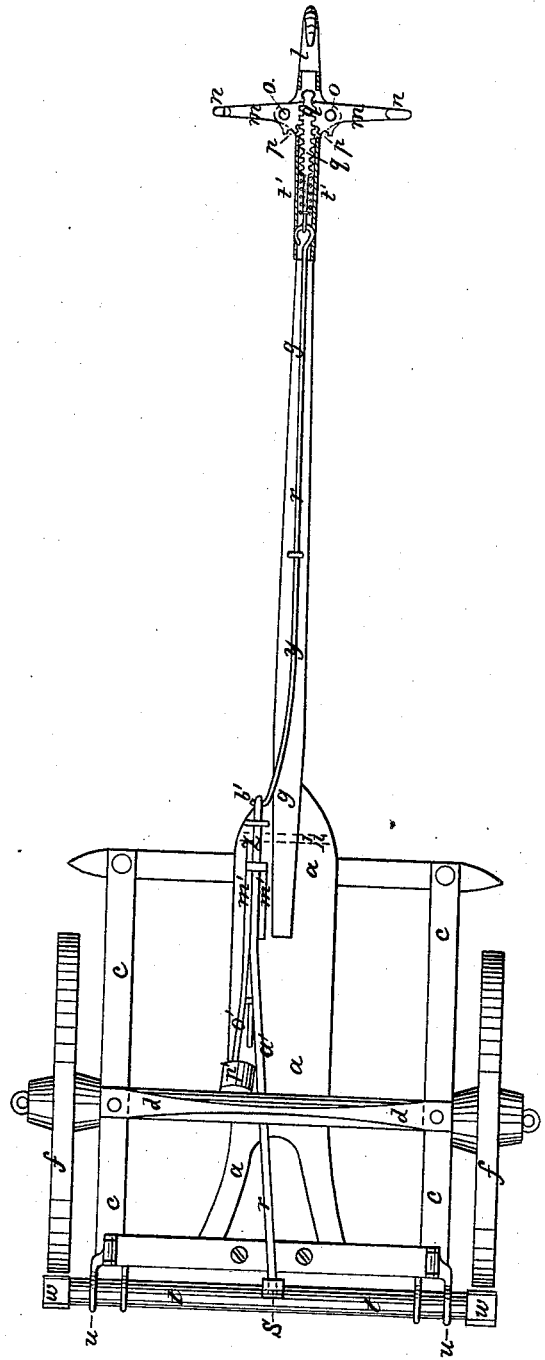
Witnesses:
Inventor:

UNITED STATES PATENT OFFICE.

C. W. GAGE, OF HOMER, NEW YORK.

IMPROVEMENT IN WAGON-BRAKES.

Specification forming part of Letters Patent No. 52,703, dated February 20, 1866.

*To all whom it may concern:*

Be it known that I, C. W. GAGE, of Homer, in the county of Courtland, and State of New York, have invented new and useful Improvements in Wagon-Brakes; and I do hereby declare that the following is a full, clear, and exact description thereof, which will enable others skilled in the art to make and use the same, reference being had to the accompanying drawings, forming part of this specification.

The present invention consists, first, in arranging and connecting the brakes of a wagon to and with the yoke-pins on the outer end of the pole in such a manner that as the horses pull back upon the same the brakes are caused to bear upon the wheels, they being retracted by the use of any suitable spring or springs attached to the same or its connecting parts as the pulling of the horses upon the yoke-pins is relieved; second, in a new and peculiar arrangement of parts, whereby the brakes, arranged as above described, can be and are prevented, when so desired, as in the case of backing the wagon, from operating or bearing upon the wheels, as will be presently particularly described.

In accompanying plate of drawings, my improvements are represented, Figure 1 being a partial sectional and side view of the same, and Fig. 2 a view of the under side.

$a\ a$ in the drawings represents a frame, in the center, $b$, of which the body of the wagon is hung as ordinarily set upon springs $c\ c$, attached to the axle $d$ in the usual or any proper manner, having wheels $f\ f$ at each of its ends. In frame $a$ the inner end of the wagon-pole $g$ is secured by a pin, $h$, so as to be detached therefrom at pleasure. The pole $g$ is made in the usual shape and manner, and has on each side of its outer end, $l$, a yoke-pin, $m$, by the eye $n$ on the outer end of which the harness of the horses is attached to the pole.

The yoke-pins $m\ m$ are, at their inner ends, hung upon pivots $o\ o$ of the pole, and engage, by teeth $p\ p$, with the doubled-toothed rack-bar $q$, placed lengthwise within the pole and connected by a rod, $r$, formed in sections, for purposes to be hereinafter specified, with the central portion, $s$, of the cross-bar $t$ turning in bearings $u\ u$ at the farther end of the two parallel springs $c\ c$, and having on each of its ends a brake-shoe, $w$, fastened thereto in any proper manner and in same vertical plane with wheels upon the rear side thereof.

The connecting-rod $r$ passes along upon the under side of the pole and frame $a$, through guide-staples $x\ x$ of any desired number, and is divided into three parts or sections, $y$, $z$, and $a'$, the first one, $y$, of which is connected with the portion $z$ by passing its bent end $b'$ through the aperture $c'$ of the same, in order that they may be readily disconnected when so desired. The middle one, $z$, has upon its lower edge, $d'$, one or more teeth, $f'\ f'$, with which the hook $g$, at or near the inner end of the rear portion, $a'$, engages, as seen in Fig. 1, the outer end being hung by a pivot, $h'$, to the brake-rod $t$, before referred to. The inner end of section $a'$ is hung on a pivot, $l'$, between two short parallel arms or bars, $m'$, connected and turning upon a pivot, $n'$, of the section $z$, one of which arms is made of a considerable greater length than the other, with its extra portion $o'$ bent, and a heavy weight, $p'$, made of any suitable material, attached to its outer end $q'$, with which weight on its arm $o'$ a card, $r'$, is attached, of sufficient length to pass up through the body of the wagon or to the driver's seat, having any suitable-shaped handle, $s'$, upon it upper end, by which it can be grasped, and the weighted end of the arm $o$ lifted, for a purpose to be specified.

In case the wagon is descending a steep declivity or it is desired to suddenly stop the same, by simply pulling and drawing the horses back with the reins, the brake-shoes are brought to bear with great pressure against the wheels, producing friction thereon and preventing the turning of the same through the connecting-rod $r$, attached to the brakes and yoke-pins, as described, which brakes are withdrawn from the wheels by the spring $t'$, around the rack-bar $q$, as the strain of the horses upon the yoke-pins is released or lessened, the advantages of which are evident to all. But in order that the brakes, when desired to back the wagon, can be then held away from the wheels, and thus kept from coming in contact therewith, I form the connecting-rod in the two pieces or parts, engaging with each other by teeth, and held together by the gravity of the weight attached to their connecting-arms, as before described, by the raising of which weight through its cord the hook of the brake portion of the connecting-rod $r$ is caused to be disconnected from the teeth of the other portion, and then moved in a backward direction a sufficient distance to throw or turn the brake-rod away from the wheels, to prevent any possibility of its shoes coming in contact with the same from the movement of the yoke-pins, as before specified, by releasing which weight or allowing it to drop the parts are again connected, as is evident without further description. Without some such arrangement of devices as described, whereby the brakes can be readily prevented by the driver from acting upon the wheels, it is evident that it would be impossible to back the wagon, and therefore the advantages of the above, in connection with self-operating brakes, are many and of vast importance.

In the case of a four-wheel wagon brakes may be also applied to the rear wheels as well as to the front ones, as has been described, it being only necessary that they should be connected to the fore brakes in any proper manner, by which they will be subject to the same movements described for the front brakes.

I claim as new and desire to secure by Letters Patent—

1. Connecting the yoke-pins of the pole to and with the brakes by means of the connecting-rod $r$, made in two or more sections, substantially as herein described, and for the purposes specified.

2. In combination with the above, the weighted lever-arm $m'$, arranged and operating substantially as and for the purpose specified.

The above specification of my invention signed by me this 12th day of April, 1865.

C. W. GAGE.

Witnesses:
 ALBERT W. BROWN,
 M. M. LIVINGSTON.